United States Patent [19]

Herlitzek

[11] Patent Number: 5,092,736
[45] Date of Patent: Mar. 3, 1992

[54] PUMP ARRANGEMENT IN A TRANSMISSION

[75] Inventor: Werner Herlitzek, Friedrichshafen, Fed. Rep. of Germany

[73] Assignee: Zahnradfabrik Friedrichshafen AG, Fed. Rep. of Germany

[21] Appl. No.: 466,383

[22] PCT Filed: Nov. 12, 1988

[86] PCT No.: PCT/EP88/01033
§ 371 Date: Apr. 23, 1990
§ 102(e) Date: Apr. 23, 1990

[87] PCT Pub No.: WO89/04930
PCT Pub. Date: Jun. 1, 1989

[30] Foreign Application Priority Data
Nov. 17, 1987 [DE] Fed. Rep. of Germany ....... 3738990

[51] Int. Cl.$^5$ .................................................. F01D 15/00
[52] U.S. Cl. .............................. 415/122.1; 415/216.1; 418/171; 74/606 R
[58] Field of Search ................... 415/122.1, 203, 216.1, 415/124.1; 416/198 R, 198 A; 417/313; 74/15.6, 15.63, 467, 606 R, 572, 574; 418/171, 166

[56] References Cited

U.S. PATENT DOCUMENTS

| | | | |
|---|---|---|---|
| 1,863,335 | 6/1932 | Hill | 418/171 |
| 2,274,836 | 3/1942 | Koster | 74/467 |
| 3,157,350 | 11/1964 | Fraser | 418/171 |
| 3,309,934 | 3/1967 | Gustafsson et al. | 74/339 |
| 4,245,519 | 1/1981 | Herlitzek | 74/331 |
| 4,541,510 | 9/1985 | Itoh et al. | 74/467 |
| 4,650,398 | 3/1987 | Brandenstein et al. | 415/170.1 |
| 4,696,201 | 9/1987 | Hattori et al. | 74/467 |

FOREIGN PATENT DOCUMENTS

| | | |
|---|---|---|
| 0076388 | 2/1981 | European Pat. Off. . |
| 0045864 | 2/1982 | European Pat. Off. . |
| 2529248 | 1/1977 | Fed. Rep. of Germany . |
| 3513217 | 10/1985 | Fed. Rep. of Germany . |
| 242171 | 5/1926 | United Kingdom ............... 417/313 |

*Primary Examiner*—Edward K. Look
*Assistant Examiner*—Hoang Nguyen
*Attorney, Agent, or Firm*—Davis, Bujold & Streck

[57] ABSTRACT

A pump arrangement for a transmission in which an integrated pump rotates with a common drive shaft (6) having a free end, supported via a shaft bearing (8), carrying a connection part (12) for accommodating a power take off shaft (14), the connection part is provided with a spline or wedge arrangement for driving both the power take off shaft (14), when attached thereto, and a pump rotor (16) of the integrated pump, a pump stator (3) is snugly positioned in a housing wall opening (2) and is provided with a bearing neck (7) supporting the shaft bearing (8), a fed inlet and a discharge outlet for the pump stator are provided in a housing wall (1) and a housing cover (19), which has a central opening (21) accommodating the connection part (12), covers a face of the pump stator adjacent the take off side.

7 Claims, 1 Drawing Sheet

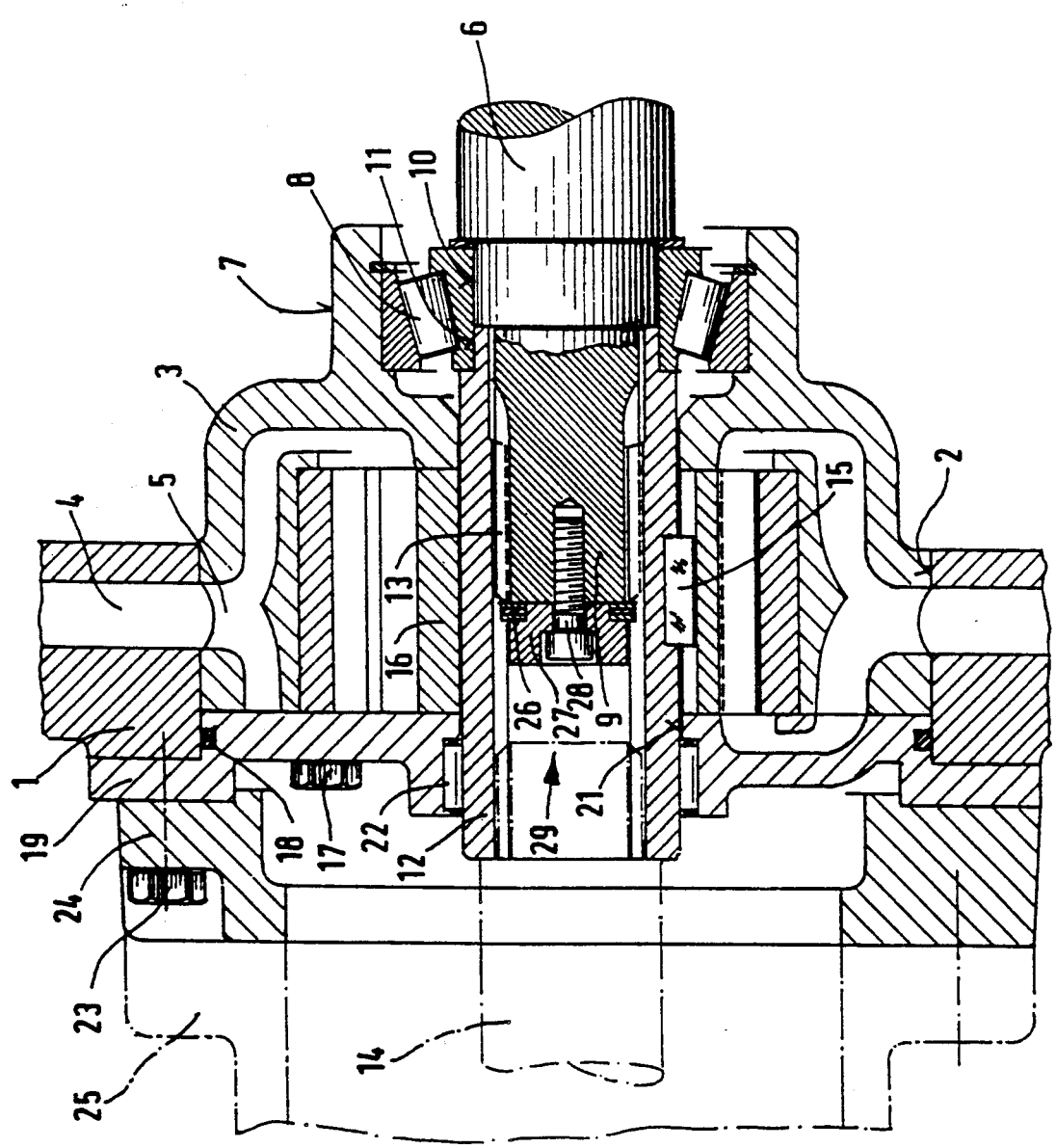

PUMP ARRANGEMENT IN A TRANSMISSION

The invention concerns a pump arrangement in a transmission according to the preamble of claim 1 and is based on DE-C 25 29 248, FIG. 1, position 26, 27.

According to the above, it is already known in transmissions having integrated pumps and optionally connectable power take-off to drive, for example, both the pump required for the oil supply of a converter and a pressure switch, and a direct power take-off by means of a common drive shaft which has on its free end, in a housing wall, a bearing which, together with a connection part of the power take-off, is fixed by a housing wall cover.

The former type of arrangement, of course, provides that the pump be situated in a manner of difficult access in the interior of the transmission and with the supports of its stator on the intermediate walls. See also the applicant's prospectus "ZF-Hydromedia-Reversing Transmission" F 43 0751/RT 3240, p.1.

This kind of arrangement required at least one separate central bearing for the pump and costly molds for the transmission housing on account of the oil channels to be provided in the interior of the transmission in intermediate walls and for shock and vibrations absorption of the pump working at a distance from the wall reinforcements.

On the basis of the above the problems to be solved, the invention is seen as providing a pump arrangement which not only provides better accessibility (without disassembling the transmission) but also makes possible a simplified construction of the transmission housing with improved absorption of vibrations and arrangement of the oil channels.

The solution is obtained with the features of claim 1 insofar as due to the combination of the power take-off with the pump, the ,latter now rests in a main bearing of the drive shaft directly on an external housing wall in which integrally cast channels contribute to more vibration absorption. Here, the complete pump can be simply and quickly changed together with the shaft bearing only after releasing a flange connection and a central screw without engaging the transmission tractions or disassembling the whole transmission. It is also favorable that the pump rotor has its own bearing on a connection part that is dismountable together with it, and the pump stator is directly attached to the housing wall so that no separate supporting ribs have to be provided therefore in the transmission housing.

With this arrangement, it is as a rule possible to omit a central support of the drive shaft by additional bearings in the interior of the housing, and a possibility of common bearing adjustment results that saves work and parts by fastening the connection part for the power take-off shaft.

Other advantageous improvements result with the embodiments defined in the sub-claims.

When the connection part, such as hollow shaft that drives the pump rotor, is provided with an internal spline inserted in the drive shaft, the power take-off shaft can be simply introduced, when needed, and the pump rotor can be fixed with special ease axially through the housing cover. When the connection part here serves for fastening a pump rotor bearing, the latter is also easily controllable from the outside.

By means of a piston-like pump stator, it is also reliably possible to seal the transmission housing by radial seals (piston or O-rings) independently of the variations of length of the shaft.

When omitting the precise processing of the internal wall of the opening of the transmission housing, the possibility of providing in the housing cover an axial sealing with respect to the pump stator is offered.

By providing a detachable axial support both between shaft and the connection part and between the later and the bearing, an especially simple fastening of pump and stator is obtained with the possibility of easy disassembling.

By a flange-like axial fastening of the pump stator on the housing cover, the complete pump, together with the housing cover and with the bearing on the connection part, can be drawn out from the housing wall opening without being disassembled and, if needed, be replaced as soon as the housing cover of the housing wall and a central screw, serving as an axial support of the connection part, with circlips between shaft and connection part are detached.

Even though the advantages of this pump arrangement are independent of the design of the pump, it is possible in the simplest manner fundamentally to realize them with rotational pumps such as gear and rotation piston pumps.

The invention is not confined to the combination of features of the claims. From the claims and individual features thereof, other logical possible combinations result to the expert as the problem arises.

The invention is explained in detail herebelow with reference to the drawing of an embodiment.

FIG. 1 shows a cross-sectional arrangement of the pump integrated into the housing wall of a transmission.

In FIG. 1, a housing wall 1 is provided with an opening 2 large enough to surround closely a pump stator 3 inserted therein piston-like from the outside. In the housing wall 1, oil channels 4 are provided which have corresponding connections with the pump stator discharge 5. The latter is penetrated along its longitudinal axis by a common drive shaft 6 which it guides by means of a bearing 8 fixed on the transmission side in a bearing neck 7. Said bearing is radially supported by its internal ring both on a ring collar 10 of the shaft 6, which opens toward the free end 9, and on a ring collar 11 of a connection part 12, similar to a hollow shaft, which opens toward the shaft 6, said connection part being non-rotatable with respect to the shaft 6 via a multi-gear spline connection 13 having an open end external side in which is insertable a power take-off shaft 14 when needed. The connection part 12 likewise has, on its external side, a driver spline 15, or in the instant embodiment a wedging, capable of carrying a pump rotor 16 attached to the pump stator 3 along in the direction of rotation. The pump stator 3 is fastened to a housing cover 19 on the take-off side by fixing screws 17 and inserted piston-like in the housing wall 1 and fitted, for example, by means of O-rings or piston rings 18. Instead of radial seals, gaskets for the housing cover can be provided. The cover 19 abuts axially close on the front side opening of the pump stator 3, on the take-off side, and has a central opening 21 through which projects, on the take-off side, the connection part 12 for the power take-off 14. A pump rotor bearing 22 is provided in the central opening 21 which is preferably designed as needle bearing and likewise can be well controlled from the outside.

The housing cover 19 is fastened, from the outside, to a processed surface of the transmission housing wall 1 by means of several fixing screws 23 which, depending on the application, can additionally carry an intermediate flange 24 which is set up either for accommodating an additional unit 25 (pump, lifting jack, or the like) that can be driven by the power take-off 14 or as seal cover of the housing wall opening 2 which is detachable independently of the pump stator 3. If an additional oil pump is operated by the power take-off, no special sealing from the pump stator 3 is needed within the housing wall 1.

The axial support 29 of the connection part 12, opposite the free shaft end 9, is detachable by means of circlips 26 and a counter disc 27 held by a central screw 28.

Several circlips 26 are inserted in an internal annular groove in the internal spline 13 of the connection part 12 so as to abut on the front edge of the take-off side of the free shaft end 9. For reinforcement, a counter disc 27 fixed to the shaft 6 by the central screw 28 is provided over the circlips 26.

In the construction according to the invention, for disassembling the pump 3, 16 and/or the bearing 6 it is only necessary to release the fixing screws 23 and the central screw 28 and to draw the circlips 26 before the complete housing, including the shaft bearing 8 and cover 19, can be removed from the wall opening 2 and the shaft 6. Since the drive shaft is supported, when parked, by gears or an additional bearing on the drive side, the complete pump-bearing structure can be easily inserted after reconstruction without another assembly opening 2 being need in the transmission housing 1 to introduce the shaft 8 therethrough into the opening of the bearing 8.

REFERENCE NUMERALS

1—housing wall
2—opening of 1
3—pump stator
4—oil channels in 1
5—connections on 3
6—drive shaft
7—bearing neck on 3
8—shaft bearing of 6
9—free end of 6
10—ring collar on 9
11—ring collar on 12
12—connection part for 14
13—multiple-tooth spline connection of 9 and 12
14—power take-off
15—external drag spline of 12
16—pump rotor
17—fixing screws
18—seals of 16
19—housing cover
20
21—central opening of 19
22—pump-rotor bearing
23—fixing screws for 19
24—intermediate or cover flange
25—installation unit with 14
26—circlips
27—counter disc
28—central screw
29—axial support of 12 against 9

We claim:

1. A pump arrangement in a transmission in which an integrated pump rotates with a drive shaft (6) having a free end (9) thereof which is supported by a shaft bearing (8), engaging a housing wall (1), and a connection part (12), for accommodating a power take-off shaft (14), is located by a housing cover (19) attached to said housing wall (1), characterized in that said connection part (12) is provided with means for driving both a power take-off shaft (14), when attached thereto, and a pump rotor (16) of said integrated pump, said connection part (12) and said pump rotor (16) are surrounded by a pump stator (3) snugly positioned in an opening (2) of said housing wall and provided with a bearing neck (7) which carries said shaft bearing (8), a feed inlet and a discharge outlet for said pump stator (3) are provided in said housing wall (1), and said housing cover (19) covers a face of said pump stator (3), on a take-off side of said integrated pump remote from said drive shaft (6), and has a central opening (21) facilitating engagement between said connection part (12) and a said power take-off shaft (14), when attached thereto.

2. An arrangement according to claim 1, wherein said pump rotor (16) has a second bearing (22) surrounding, adjacent the take-off side, a portion of said connection part (12).

3. An arrangement according to claim 1, wherein said pump stator (3) is fitted in said housing wall opening (2) and has a sealing element (18) located between said housing cover and said housing wall (1).

4. An arrangement according to claim 1, wherein said connection part (12) comprises an elongate hollow shaft having external means for driving said pump rotor (16) and an internal spline engagable with a said power take-off shaft (14), adjacent one end thereof, and meshing with an external spline on the free end of said drive shaft (6), adjacent the other end thereof.

5. An arrangement according to claim 1, wherein said connection part (12) is secured by a detachable axial support (29) with respect to both said drive shaft (6) and said shaft bearing (8).

6. An arrangement according to claim 5, wherein said pump stator (3) is fastened to said housing cover (19) so that after detaching said housing cover (19) from said housing wall (1) and removing said detachable axial support (29) of said connection part (12), said housing cover (19) is removable, from the free end of said drive shaft (6), together with said pump rotor (16), said pump stator (3) and said bearing (8) as a single unit and can be withdrawn from said housing wall opening (2).

7. An arrangement according to claim 1, further comprising a said power take-off shaft (14) engaging said connection part (12).

* * * * *